Patented Oct. 10, 1933

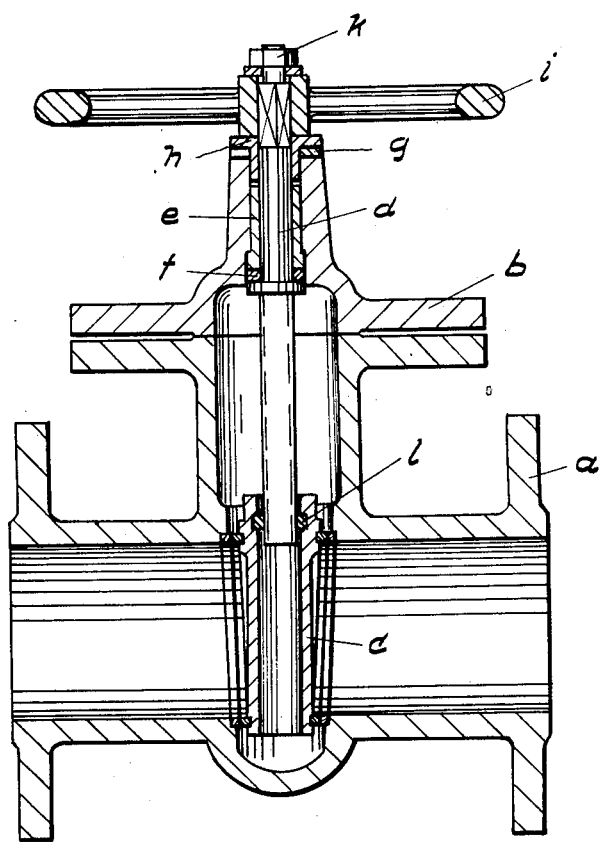

1,929,645

UNITED STATES PATENT OFFICE 1,929,645

PACKING FOR GATE VALVES AND SIMILAR SHUTTING-OFF ELEMENTS

Wilhelm Lüders, Hamburg, Germany

Application March 12, 1931, Serial No. 522,017, and in Germany February 4, 1931

1 Claim. (Cl. 251—62)

This invention relates to a packing for gate valves and similar shutting off elements, without a stuffing box, in order to avoid the inconveniences of the latter, and in order to make the element itself simpler as regards construction and attendance, the packing being at least the same.

The packing consists essentially of an easily interchangeable ring, which is arranged between a collar of the spindle and a shoulder of the valve bonnet or a bushing embedded in this bonnet. An easy accessibility of the packing is then obtained and the fact is of importance, that in shutting-off and similar elements the packing ring can be substituted for the stuffing box without any alteration of the valve casing. In new constructions the simplification is obtained, that instead of the casing bonnet made of several parts and instead of the several packings required therefor, a casing bonnet made in one part only is required, in which, as described, the spindle has mounted thereon the collar above the packing disc is placed.

An embodiment of the invention is illustrated by way of example in the only figure of the accompanying drawing which shows in cross section a gate slide valve of improved construction.

Above the casing $a$ a gate valve bonnet $b$ made in one piece is fixed by means of flanges. A spindle $d$ is journalled in a central bore of the bonnet. $c$ is the commonly used gate and $l$ the gate nut. Above the collar of the spindle $d$ a packing ring $f$ is located in the bore of the bonnet $b$ and covered by a sleeve $e$, securely held in the bore of the cover against shifting in upward direction. On the top edge of the bonnet $b$ a spring ring $g$ is placed, which produces a permanent packing pressure between spindle collar and packing ring $f$ and sleeve $e$. $h$ is a closing bushing, $i$ a hand wheel and $k$ a locking and re-adjusting nut.

If a damaged packing ring $f$ has to be replaced, this is possible without difficutly by unscrewing nut $k$, removing the flanged bonnet $b$ and pulling the spindle $d$ in downward direction out of this bonnet so that the packing ring $f$ is accessible. It is evident that this packing forms a simple and cheap substitute for the stuffing box and avoids all the inconveniences connected with such stuffing boxes.

I claim:—

A packing for gate valves comprising in combination, a casing, a bonnet on said casing detachably connected to said casing by a flange having a central bore, a sleeve inserted in said bore from below, a bushing in the upper end of said bore, a flat packing ring in the lower end of said bore below said sleeve, a spindle extending into said casing through the bushing, sleeve and ring, a collar on said spindle, a flange on the upper end of said bushing, a spring ring between said flange and the upper end of said bonnet adapted to pull said collar tightly against said packing ring, a hand wheel on the upper end of said spindle, and a nut above said hand wheel adapted to regulate the pressure exerted by said hand wheel on said bushing flange and consequently on said spring ring and the bearing pressure of said collar against said packing ring.

WILHELM LÜDERS.